INVENTORS
MALCOM SPINRAD
KENNETH C. HAAS
BRYCE E. HOVERTER

BY Richard O. Church

ATTORNEY

INVENTORS
MALCOM SPINRAD
KENNETH C. HAAS
BRYCE E. HOVERTER

BY *Richard O. Church*

ATTORNEY

United States Patent Office 3,477,001
Patented Nov. 4, 1969

3,477,001
REVERSING PLUG FOR ELECTRIC MOTOR
Malcom Spinrad, Reading, Kenneth C. Haas, Mohnton, and Bryce E. Hoverter, Reinholds, Pa., assignors to American Safety Table, a Teledyne Company, a corporation of Pennsylvania
Filed May 23, 1967, Ser. No. 640,708
Int. Cl. H02p *3/20, 1/40, 7/36*
U.S. Cl. 318—207  8 Claims

ABSTRACT OF THE DISCLOSURE

The direction of rotation of either a single or three phase electrical motor is controlled by interposing a plug and socket between the windings of the motor and a source of electrical power. The plug and socket are wired to permit reversal of the direction of rotation of the motor by disconnecting the plug and socket and reconnecting them in an inverted position with respect to each other. In the preferred embodiment, the plug and socket are designed with three pairs of connectors, each spaced in concentric relationship to a central connector.

---

This invention relates to alternating current electric motors and methods and apparatus that facilitate reversing the direction of their rotation.

More particularly, this invention relates to a seven terminal, two position reversing connector comprised of plug and socket members that, when the members are inverted with respect to each other, will cause the direction of rotation of either a three phase or single phase motor to be reversed.

As is well known, the direction of rotation of a three phase motor may be reversed if the connections to two of the phase windings are changed and the connection to the third phase winding is left unchanged. The direction of rotation of a single phase motor with starting windings can be reversed either by interchanging the leads to the field windings while leaving the leads to the starting windings unchanged.

It is common practice, when wiring motors of this sort, to attach the leads tentatively, determine the direction of rotation of the motor, and then permanently attach the leads in a manner that will cause the motor to rotate in the desired direction. In those instances where it is desired to alter the direction of rotation of the motor after a permanent connection has been made, motor controllers with selectively operated contacters may be provided or separate switching devices may be used to alter the connections to the windings and reverse the direction of rotation of the motor.

While the above devices are satisfactory for use with larger motors that require controllers in any instance, it is a needless expense to attach them to fractional horsepower motors merely to permit reversal of the direction of rotation. Separate switching arrangements, in addition to increasing costs, may also be awkward and inconvenient to position near a small motor.

As an example of the sort of problem with which this invention is concerned, reference is made to fractional horsepower motors used to operate sewing machines. In various mills where cloth is sewn, it is common practice to mount these motors on a sewing table, but it is not unusual, as requirements demand from time to time, to remove a sewing machine from a sewing table and replace it with another. As sewing machines sold by some manufacturers are adapted to be driven in one direction and some in the other direction, the replacement of one sewing machine with another on a given sewing table may require reversing the rotation of the motor. For this reason, it is useful to have a simple and inexpensive method by which this required reversal in the direction of rotation can be accomplished.

Accordingly, it is an object of this invention to provide methods and apparatus to facilitate reversing the direction of rotation of either a single or three phase motor.

Another object of this invention is to provide apparatus that will enable reversal of a single or three phase motor quickly, with facility, and without requiring the use of separate switches, panel boards, extra terminals or controllers.

Briefly, these and other objects of this invention are achieved by utilizing a seven terminal female socket that is adapted to receive a corresponding male plug. The plug and socket are interposed between the windings of an electric motor and the power source, and are wired in such a manner that when the plug and socket are connected in a first position, the motor will be caused to rotate in one direction, and when the plug and socket are connected in an inverted second position, the motor will be caused to rotate in the other direction.

The present invention can be better understood in connection with the following description of the drawings in which.

Figures 1A, 1B:
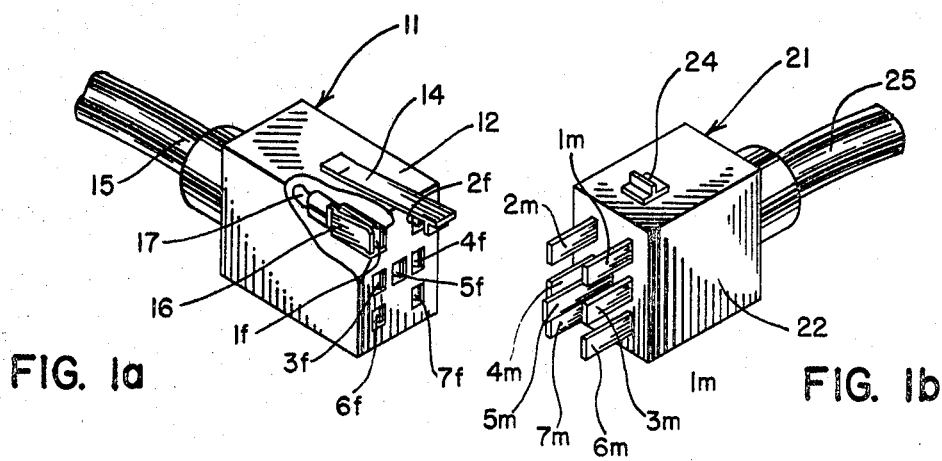
FIG. 1a is a perspective view, partially broken away, of a female socket made in accordance with this invention.
FIG. 1b is a perspective view of a male plug made in accordance with this invention.

As is illustrated in FIGS. 1a and 1b, there is generally provided a female socket 11 and a mating male plug 21 that are adapted to be joined in electrical connecting relationship with each other. The female socket 11 is provided with a housing 12 that supports in place a number of pin socket connectors, indicated in the drawings by numerals 1f–7f. The pin socket connectors 1f–7f of the female socket 11 may conveniently be comprised of a pair of elongated metallic leaf elements 16 biased to remain in a closed position, but adapted to spread and receive a pin connector of the male plug 21 in secure electrical connection with each other.

The pin socket connectors 1f–7f are attached at their closed ends to hookup wires 17 and the various hookup wires 17 are led through the rear of the socket to form cable 15 that is connected to a source of power (not shown). A locking clip 14 is provided on the housing 12 of the female socket 11 that is adapted to seat in locking engagement with a locking bracket 24 provided on the male plug 21.

The male plug 21 is comprised of a housing 22 that supports a number of pin type connectors indicated in the drawings by numbers 1m–7m. These connectors 1m–7m are attached at their base by hookup wires (not shown) that are bundled into a cable 25 that leads from the plug to a motor (not shown). As mentioned above, the housing 22 of the male plug 21 is provided with a bracket 24 adapted to lock the male plug 21 with the female socket 11 when they are positioned in mating relationship to each other. By these means, the male plug 21 and the female socket 11 are locked together and neither accidential strains placed upon the cables nor machine vibration, will break the cables' connection.

Figures 2A, 2B:
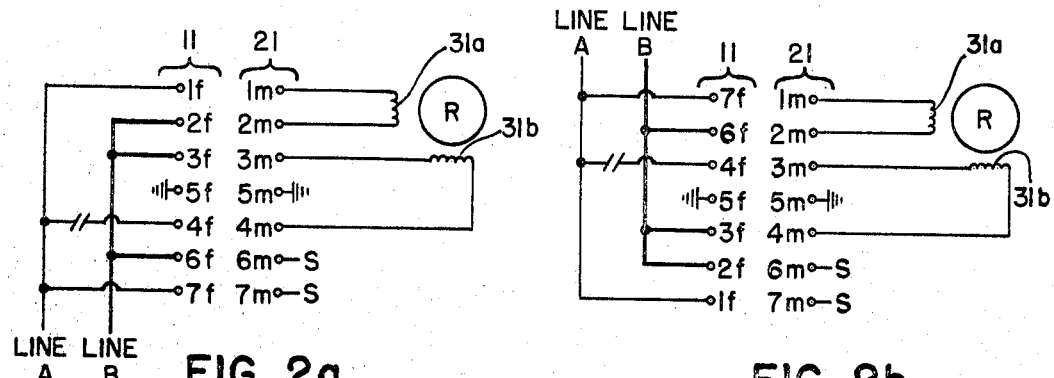
FIG. 2a is a schematic wiring diagram showing the male plug and the female socket wired for operating a single phase motor.
FIG. 2b is a schematic wiring diagram, similar to that of FIG. 2a, showing the female socket in a reversed position with respect to the male plug.

FIGS. 2a and 2b schematically illustrate the wiring of the female socket 11 and the male plug 21 for use with a single phase capacitor motor. Referring first to the female socket shown in FIGS. 2a and 2b, the connectors are wires as follows:

Connector 1f to power line A
Connector 2f to power line B
Connector 3f to power line B
Connector 5 to ground
Connector 4f to power line A (via a capacitor)
Connector 6f to power line B
Connector 7f to power line A The male plug 21 is shown properly wired to a single phase capacitor motor schematically illustrated as having a rotor R and phase windings 31a and 31b. The connectors are wired as follows:

Connector 1m to phase winding 31a
Connector 2m to phase winding 31a
Connector 3m to phase winding 31b
Connector 5m to ground
Connector 4m to phase winding 31b
Connectors 6m and 7m are unused spare terminals.

FIGS. 2a and 2b are identical except that in FIG. 2b, the female socket 11 has been inverted with respect to the male plug 21. Despite this inversion, the connectors 1m and 2m of phase winding 31a remain connected to power lines A and B respectively. However, the connectors 3m and 4m of phase winding 31b are now reversed with respect to power lines A and B. As shown in FIG. 2a, connector 3m is connected to power line B and connector 4m is connected to power line A, whereas in FIG. 2b, this is reversed and connector 3m is connected to line A and connector 4m is connected to line B. By these means, the direction of rotation of the single phase motor can be reversed simply by uncoupling the female socket 11 and the male plug 21 and reconnecting them in a reversed relative position.

In the above wiring diagram, the capacitor for phase winding 31b is illustrated as being located in the power line rather than as a part of the motor windings. It will be understood that this is a matter of convenience and has no bearing on the instant invention. Also, while FIGS. 2a and 2b illustrate a capacitor-run motor, the invention is not so limited but is equally applicable to other types of single phase revesible motors such as those having split phase or capacitor starting windings.

Figures 3A, 3B:
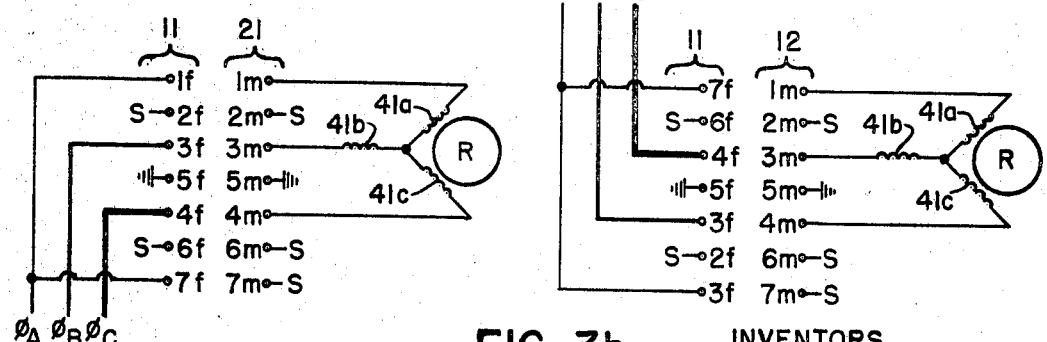
FIG. 3a is a schematic wiring diagram showing the male plug and the female socket wired for operating a three phase motor.
FIG. 3b is a schematic wiring diagram similar to FIG. 3a showing the female socket in a reversed position with respect to the male plug.
Figure 4:
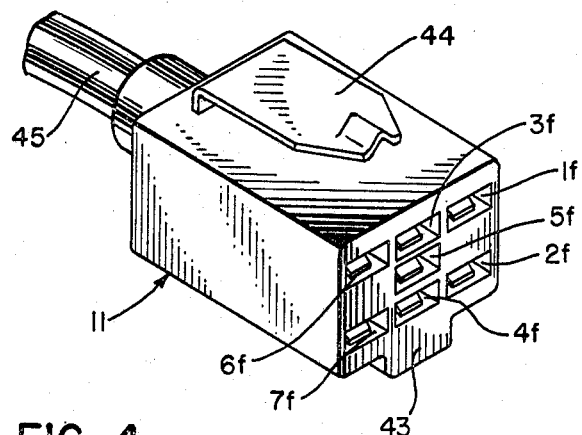
FIG. 4 is a perspective view of another type of female socket made in accordance with this invention and adapted to be used with the male plug of FIG. 5.
Figure 5:
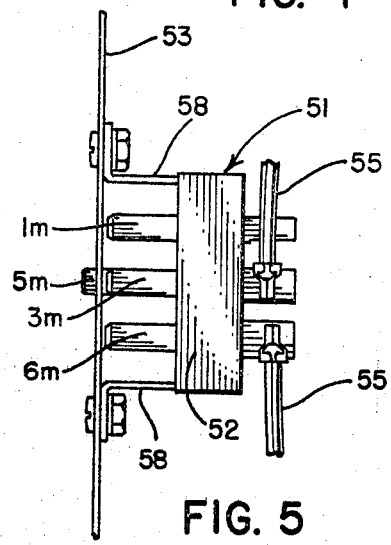
FIG. 5 is a side view of a male plug adapted to be flush mounted on a motor.

In FIGS. 3a and 3b, there is schematically shown the wiring of the female socket 11 and the male plug 21 for use with a three phase induction motor. With regard to the female socket shown in FIGS. 3a and 3b, the connections are as follows:

Connector 1f to phase A
Connector 3f to phase B
Connector 5f to ground
Connector 4f to phase C
Connector 7f to phase A
Connectors 2f and 6f are unused spare terminals.

The male plug 21 is shown wired to the three phase windings 41a, 41b and 41c of a three phase alternating current motor. The connections are as follows:

Connector 1m to phase winding 41a
Connector 3m to phase winding 41b
Connector 5 to ground
Connector 4m to phase winding 41c
Connectors 2m, 6m and 7m are unused spare terminals.

As illustrated in FIGURES 3a and 3b, inversion of the female socket 11 relative to the male plug 21 will not affect the connection of phase winding 41a to phase A of the power source. However, after such inversion, the power connections to phase windings 41b and 41c will be reversed. From this it can be understood that inversion of the female socket 11 with respect to the male plug 21 will reverse the connections to two of the phase windings, but not the third, thus providing selective control over the direction of rotation of the three phase motor. While the schematic wiring diagram illustrates a star or "Y" connection to the phase windings, the invention is equally applicable to delta connections.

In FIGURES 4–7, a slightly different arrangement is shown wherein the male plug 21 is an integral part of a panel terminal adapted to be flush mounted on the motor frame. This is easily accomplished by providing legs 58 (FIGURE 5) that space the male connector block 51 from a mounting plate 53. The connector block 51 is quite similar to the male plug 21 of FIGURE 1b except that the body of the plug 52 is somewhat narrower and supports bayonet connectors on one side (1m, 3m, 5m and 6m are visible), and terminals 56 on the other side for direct attachment to the windings of the motor by means of motor winding leads 55.

Note that a separate ground wire is not required since the mounting plate 53 is directly attached to the motor housing. As can best be seen in FIGURE 7, the legs 58 are electrically connected to ground terminal 5m by means of a bus 59. Advantageously, the legs 58, the bus 59 and the bayonet terminal 5m can be made from a single piece or stamping.

Figure 6:
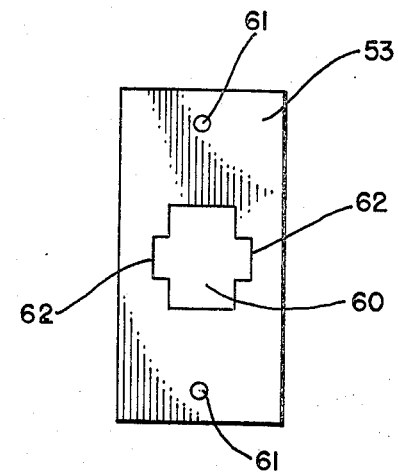
FIG. 6 is a view in plan of the flush mounting plate shown in FIG. 5.
Figure 7:
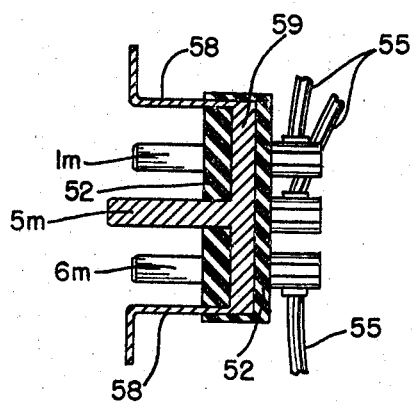
FIG. 7 is a view in section of the male plug shown in FIG. 5.

As shown in FIGURE 6, the face plate 53 contains an opening 60 adapted to receive the female socket 43. Two cut-out portions 62 are provided in the opening 60, one to receive guide portion 43 of socket 11 and the other to receive locking mechanism 44. The locking device 44 is made of a spring steel and will lock under the face plate and hold the female socket securely engaged with the male plug.

The male plug and the female socket as herein described may be reversed with respect to each other without departing from the spirit of the invention. That is, the female socket may be associated with the motor rather than the power leads and the male plug may be associated with the power leads rather than the motor. This arrangement generally is not preferred since, when the plugs are unconnected, the pin connectors of the male plug will be exposed and a danger of shock or short circuiting will be present.

With regard to the spacing of the pin and pin socket connectors, it can be seen that they must be arranged in such a manner that the plug and socket will fit together in either of two positions 180° apart from each other. This can be accomplished by designing the connectors as shown in the drawing or by using any other geometric form that will enable achieving the same result. For example, if one of the connectors is located at a central position, the other six connectors can be spaced around it in three pairs with both terminals of a given pair lying on a common straight line that passes through the central terminal and with each terminal of a given pair being spaced equal distances away from, but on opposite sides of, the central terminal. Any geometric arrangement of terminals that fits these criteria can be used in the practice of this invention.

It is also desirable to make the pin terminal 7m longer than the other pin terminals. If this is done, pin terminal 7m will complete the ground connection to the motor prior to the time that the power leads are attached. This is for safety purposes to insure that the power leads cannot be attached prior to the time that adequate grounding is achieved.

While both the male plug and the female socket are illustrated in the drawings as having seven connectors or terminals, it can be seen that only the plug or socket that is connected to the power source will utilize all seven connectors. The plug or socket that is connected to the motor need use only four of the connectors (including the ground connector) when attached to a three phase motor, and five connectors (including the ground connector) when attached to a single phase motor. Even though several of these terminals could be eliminated, it is preferred for convenience and reliability to provide seven connectors on both the male plug and female socket.

In the above wiring diagrams, it will be seen that when used with a single phase motor, the female plug has three of its connectors (1f, 3f and 6f) connected to the other line. While not necessary, it may be convenient to make connections between the terminals in the body of the plug itself so that when the plug is attached to the line, all of the connections between connectors having a common power source need not be made by the workman.

Similarly, with respect to plugs used for three phase motors, a permanent connection can be made between the two connectors 1f and 7f. Note, however, that whether the plug be used for a single phase or a three phase motor, one pair of connectors (3m and 4m as illustrated in the drawing) will always remain electrically isolated.

Although certain embodiments of the invention have been shown in the drawings and described in the specification, it is to be understood that the invention is not limited thereto, is capable of modification, and can be rearranged without departing from the spirit and scope of the invention.

We claim:
1. An alternating current electric motor that may selectively be rotated in either direction comprising:
 a power cable electrically connected on one of its ends to a source of alternating current, and at the other of its ends to a first electrical coupler;
 a motor cable electrically connected at one of its ends to the windings of said motor, and at the other of its ends to a second electrical coupler;
 said first coupler having seven connectors arranged and wired as follows:
  a centrally positioned connection connected to ground;
  a first, second and third pair of connectors spaced from said central connector in such a manner that:
   both connectors of a given pair lie on a common straight line that passes through said central connector, and
   both connectors of a given pair are spaced equal distances from, but on opposite sides of, said central connector; and
   both connectors of said first pair of connectors being electrically isolated from each other, and both connectors of said second pair of connectors being electrically connected with each other;
 said second coupler having at least five connectors arranged and wired as follows:
  a centrally positioned connector connected to the motor ground, and
  a first pair of connectors positioned to seat in electrically conducting relationship with said first pair of connectors of said first coupler, and
  a fourth connector positioned to seat in electrically conducting relationship with one connector of said second pair of connectors of said first coupler, and
  a fifth connector positioned to seat in electrically connecting relationship with one connector of said third pair of connectors of said first coupler.

2. A motor according to claim 1 in which one of said first and said second couplers carries pin terminals, and the other of said couplers carries pin socket terminals.

3. A motor according to claim 2 in which said centrally positioned pin terminal is longer than, and extends beyond, said other pin terminals.

4. A motor according to claim 1 in which said motor is a three phase motor having leads from two of the phase windings connected to different connectors of said first pair of connectors of said second coupler and the lead from the third phase winding connected to said fourth connector.

5. A motor according to claim 4 in which one phase of a three phase power source is connected to said second pair of connectors of said first coupler, a second phase of said power source is connected to one connector of said first pair of connectors of said first coupler, and a third phase of said power source is connected to the other one of said connectors of said first pair of connectors of said first coupler.

6. A motor according to to claim 1 in which said motor is a single phase motor having at least two windings, with the leads to one of said at least two windings connected to said first pair of connectors of said second coupler, and the leads to the other of said at least two windings connected to said fourth and fifth connectors of said second coupler.

7. A motor according to claim 6 in which:
 said third pair of connectors of said first coupler are electrically connected with each other and to one line of a source of single phase alternating current,
 said second pair of connectors of said first coupler are connected to the other line of said source, and
 one of said connectors of said first pair of connectors of said first coupler is connected to said second pair of connectors of said first coupler, and said other connector of said first pair of connectors of said first coupler is connected to said third pair of connectors of said first coupler.

8. A motor according to claim 7 in which said motor is a capacitor-run motor.

References Cited

UNITED STATES PATENTS

| | | | |
|---|---|---|---|
| 2,922,054 | 1/1960 | Miller | 310—71 |
| 3,185,875 | 5/1965 | Harris | 310—71 |
| 3,210,578 | 10/1965 | Sherer | 318—225 XR |
| 3,231,767 | 1/1966 | Powell | 310—71 |
| 3,350,587 | 10/1967 | Turk | 310—71 |

ORIS L. RADER, Primary Examiner

G. RUBINSON, Assistant Examiner

U.S. Cl. X.R.

310—71; 318—225